W. WEIS.
Making Vinegar.
No. 62,715.  Patented March 5, 1867.
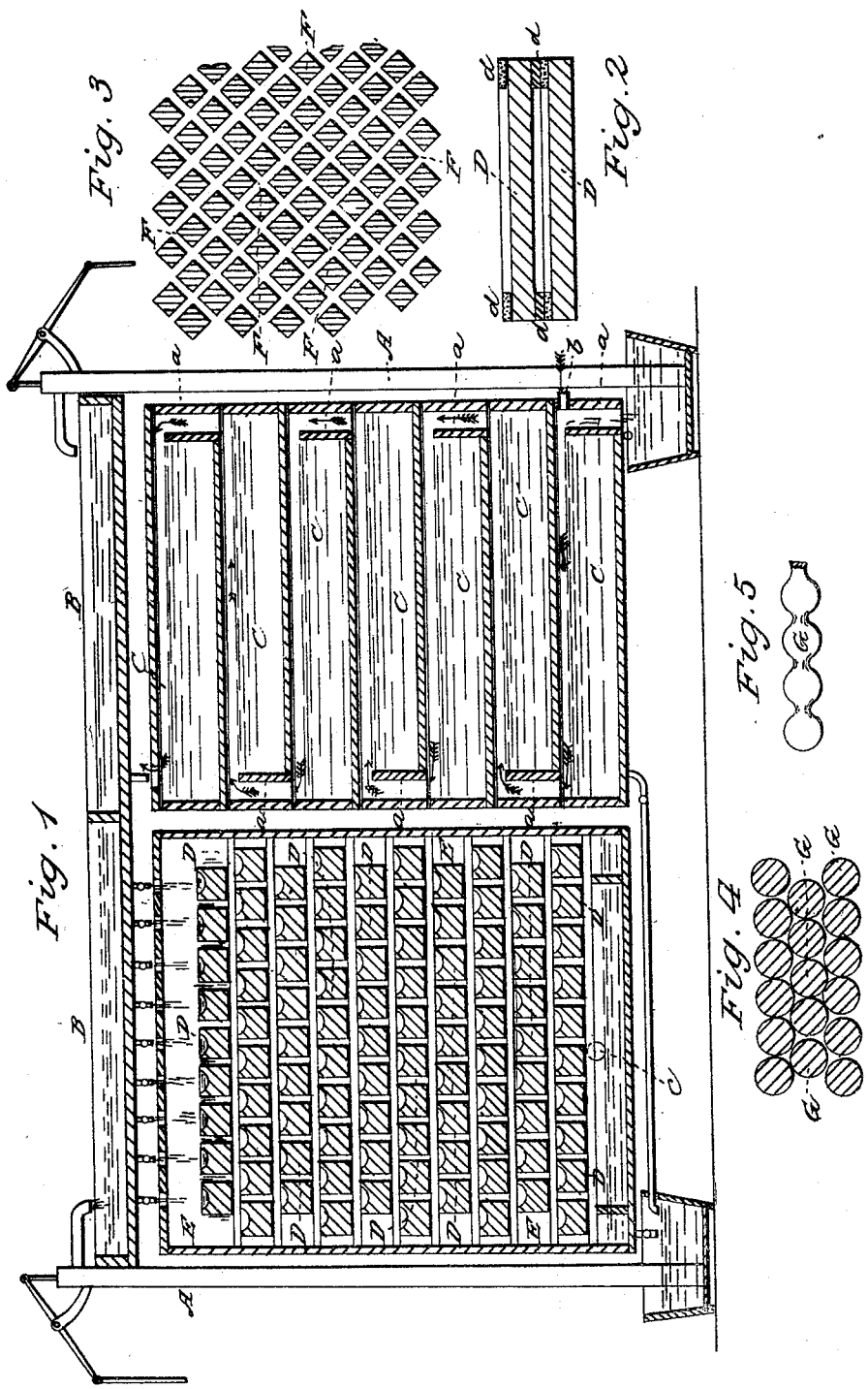

United States Patent Office.

WENDELIN WEIS, OF SAINT PAUL, MINNESOTA.

*Letters Patent No. 62,715, dated March 5, 1867.*

IMPROVED APPARATUS FOR MAKING VINEGAR.

*The Schedule referred to in these Letters Patent and making part of the same.*

TO ALL WHOM IT MAY CONCERN:

Be it known that I, WENDELIN WEIS, of Saint Paul, in the county of Ramsey, and State of Minnesota, have invented a new and improved Apparatus for Making Vinegar; and I do hereby declare that the following is a full, clear, and exact description thereof, which will enable others skilled in the art to make and use the same, reference being had to the accompanying drawings, forming part of this specification, in which—

Figure 1 represents a sectional elevation of my invention.

Figure 2 is a detail sectional view through two of the troughs D.

Figures 3, 4, and 5 show modifications of my invention.

Similar letters of reference indicate like parts.

The object of this invention is to arrange an apparatus whereby alcoholic liquor may be converted into vinegar in the shortest possible space of time. The invention consists in so constructing the aforesaid apparatus that the liquid, when poured into it, will slowly trickle down from one vessel to another, thereby exposing every drop to the atmosphere; and thus every particle of the liquid is enabled to absorb the oxygen from the air, and be thereby converted into vinegar.

All substances that contain sugar may be employed in the manufacture of vinegar in my apparatus. Sorghum or maple sirup, cider, beer, malt, or corn may be used with equal advantage. The said articles are mixed with water; some yeast is then added; and, when fermentation is completed, the mixture is clarified by being strained through chips of beech wood, or through corn cobs, and is then placed into an air-tight vessel. After remaining there for about eight days, the liquid, being sufficiently clarified, is conveyed by means of pumps A, or by any other suitable device, into a box, B. Thence it flows in a very fine stream into a box, C, one end wall, $a$, of which is lower than the rest. Said box is completely filled with vinegar, so that the liquid will mix with the vinegar in the box C, and will then trickle down over the edge of the board $a$ into a box, C, which is arranged below, and so on. The liquid passes from one box to another, being exposed to the air not only in the boxes, but especially as it trickles down from one box to another. A current of warm air enters the lowest box C through the tube $b$, and passes, in the direction of the arrows, over all the boxes, and through the streams of the liquid that fall down from box to box. Thus a great portion of the liquid is directly exposed to the air, and thus the scum or vinegar mother is formed. So much of the liquid as is sufficiently purified and enabled by the above process to stand a greater amount of heat is now poured into troughs D, the ends of which are closed by blocks $d$, as shown in fig. 3, and which are arranged in an air-tight box, E, into which warm air is brought through an opening, $c$, when desired. These troughs D are arranged in rows above one another, so that, when those in the upper row are filled, the liquid flows over the edges into the troughs in the second row, and so forth, thus exposing every particle of the liquid to the air, so that when it is drawn off it is vinegar fit for market. If the apparatus is not large enough, the liquid may be passed through it more than once, until it is ready for use. In place of the troughs D I may as well employ a series of blocks, F, which are laid (fig. 3) on edge, so that the liquid which is poured upon the upper row will be spread over the two upper sides of each block, and will then slowly drop upon the block below, and so forth, completely exposing the liquid to the air. Should these blocks F not be laid perfectly level, the liquid may be apt to flow along the lower edge or corner of each block to its end, and would then drop upon the next lower block. To avoid this inconvenience, I would use round blocks G, of which fig. 5 shows a side view. These blocks are turned, and provided with alternate convex and concave parts, as shown. They are laid upon each other, as shown in fig. 4. The liquid cannot flow to one end of either of these bars, but is obliged to drop from one bar to the next below, surrounding all the bars in one box, and being thus completely exposed to the action of the air.

I claim as new, and desire to secure by Letters Patent—

An apparatus for making vinegar, which consists of the boxes C C, troughs D D, or blocks F or G, all made and operating substantially as and for the purpose herein shown and described

WENDELIN WEIS.

Witnesses:
G. SIEGENTHALER,
U. SIEGENTHALER.